United States Patent
Suto et al.

(10) Patent No.: US 10,003,712 B2
(45) Date of Patent: *Jun. 19, 2018

(54) ILLUMINATING DEVICE, IMAGE READING APPARATUS INCLUDING THE ILLUMINATING DEVICE, AND IMAGE FORMING APPARATUS INCLUDING THE IMAGE READING APPARATUS

(71) Applicant: SHARP KABUSHIKI KAISHA, Sakai, Osaka (JP)

(72) Inventors: Yasuhiro Suto, Sakai (JP); Mitsuharu Yoshimoto, Sakai (JP); Tomohiko Okada, Sakai (JP); Hisashi Yamanaka, Sakai (JP); Shohichi Fukutome, Sakai (JP); Kenji Nakanishi, Sakai (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/482,122

(22) Filed: Apr. 7, 2017

(65) Prior Publication Data

US 2017/0214815 A1    Jul. 27, 2017

Related U.S. Application Data

(60) Continuation of application No. 15/174,385, filed on Jun. 6, 2016, now Pat. No. 9,648,192, which is a
(Continued)

(30) Foreign Application Priority Data

Oct. 30, 2009 (JP) ................................ 2009-251251

(51) Int. Cl.
*H04N 1/04* (2006.01)
*H04N 1/028* (2006.01)
(Continued)

(52) U.S. Cl.
CPC ........... *H04N 1/0285* (2013.01); *G02B 6/009* (2013.01); *G02B 6/0055* (2013.01); *G03G 15/04* (2013.01);
(Continued)

(58) Field of Classification Search
CPC ......... H04N 21/42653; H04N 21/4312; H04N 21/485; H04N 2213/001; H04N 5/445;
(Continued)

(56) References Cited

U.S. PATENT DOCUMENTS 4,733,307 A    3/1988    Watanabe
4,750,045 A    6/1988    Ohara et al.
(Continued)

FOREIGN PATENT DOCUMENTS

JP    02-280566 A    11/1990
JP    3-165661 A    7/1991
(Continued)

OTHER PUBLICATIONS

Notice of Allowance dated Feb. 7, 2014 for U.S. Appl. No. 13/502,678.
(Continued)

*Primary Examiner* — Negussie Worku
(74) *Attorney, Agent, or Firm* — Birch, Stewart, Kolasch & Birch, LLP

(57) ABSTRACT

An illuminating device capable of stably illuminating an irradiated object such as a document while suppressing light loss with a simply structure is provided. An LED array and a reflective plate are disposed sandwiching a slit (St) through which light reflected by a document MS passes and a light-guiding member is disposed on the side of the LED array. The light-guiding member includes a direct emission unit disposed between an illumination range y centered on a document reading position and the LED array and an
(Continued)

indirect emission unit disposed between the reflective plate and the LED array, a light incidence face of the direct emission unit and a light incidence face of the indirect emission unit are disposed at mutually different position around the LED array, and the LED array is disposed on a side of an interior angle formed by the light incidence faces.

9 Claims, 8 Drawing Sheets

Related U.S. Application Data division of application No. 14/750,919, filed on Jun. 25, 2015, now Pat. No. 9,383,500, which is a division of application No. 14/292,502, filed on May 30, 2014, now Pat. No. 9,097,830, which is a continuation of application No. 13/502,678, filed as application No. PCT/JP2010/068150 on Oct. 15, 2010, now Pat. No. 8,755,095.

(51) Int. Cl.
*H04N 1/00* (2006.01)
*H04N 1/10* (2006.01)
*F21V 8/00* (2006.01)
*G03G 15/04* (2006.01)

(52) U.S. Cl.
CPC ..... *H04N 1/00278* (2013.01); *H04N 1/02855* (2013.01); *H04N 1/02865* (2013.01); *H04N 1/1013* (2013.01); *H04N 2201/0081* (2013.01); *H04N 2201/0094* (2013.01); *H04N 2201/02462* (2013.01); *H04N 2201/0434* (2013.01)

(58) Field of Classification Search
CPC ...... H04N 5/655; H04N 9/3141; F21V 14/04; F21V 21/26; F21V 7/10; F21V 13/02; F21V 19/004; F21V 21/005; F21V 2200/20
USPC .......... 358/475, 474, 501, 505, 509
See application file for complete search history.

(56) References Cited

U.S. PATENT DOCUMENTS

| | | | |
|---|---|---|---|
| 4,924,357 A | 5/1990 | Yamashita et al. | |
| 6,724,503 B1 | 4/2004 | Sako et al. | |
| 7,085,023 B2 | 8/2006 | Okamoto et al. | |
| 7,619,785 B2 | 11/2009 | Sodeura et al. | |
| 7,899,094 B2 | 3/2011 | Kamijima et al. | |
| 7,903,298 B2 | 3/2011 | Sawada et al. | |
| 7,924,478 B2 | 4/2011 | Kim et al. | |
| 8,379,275 B2 | 2/2013 | Tahk et al. | |
| 8,395,829 B2 | 3/2013 | Takahashi et al. | |
| 8,422,093 B2 | 4/2013 | Ishida | |
| 8,422,917 B2 | 4/2013 | Shinkawa | |
| 8,515,313 B2 | 8/2013 | Suto et al. | |
| 8,537,435 B2 | 9/2013 | Nagamochi et al. | |
| 8,619,342 B2 | 12/2013 | Higashitani | |
| 8,625,170 B2 | 1/2014 | Imoto et al. | |
| 8,634,120 B2 | 1/2014 | Popovich et al. | |
| 8,654,409 B2 | 2/2014 | Shimizu | |
| 8,755,095 B2* | 6/2014 | Suto ................ | H04N 1/02845 358/474 |
| 8,830,541 B2 | 9/2014 | Ozawa et al. | |
| 8,964,264 B2 | 2/2015 | Suto et al. | |
| 9,097,830 B2* | 8/2015 | Suto ................ | H04N 1/02845 |
| 9,383,500 B2* | 7/2016 | Suto ................ | H04N 1/02845 |
| 9,648,192 B2* | 5/2017 | Suto ................ | H04N 1/0285 |
| 2005/0088707 A1 | 4/2005 | Sakurai et al. | |
| 2005/0094215 A1* | 5/2005 | Nagasaka .......... | H04N 1/00002 358/406 |
| 2005/0135840 A1 | 6/2005 | Sakurai et al. | |
| 2007/0159851 A1 | 7/2007 | Lee et al. | |
| 2008/0231917 A1* | 9/2008 | Tsukahara ......... | H04N 1/00002 358/475 |
| 2009/0015883 A1 | 1/2009 | Kim | |
| 2009/0027915 A1 | 1/2009 | Kaneko | |
| 2010/0129116 A1 | 5/2010 | Shinkawa | |
| 2010/0215404 A1 | 8/2010 | Okamoto | |
| 2010/0231989 A1* | 9/2010 | Inadome .......... | H04N 1/02885 358/474 |
| 2010/0283717 A1 | 11/2010 | Oka et al. | |
| 2011/0228353 A1* | 9/2011 | Okamoto .......... | H04N 1/02815 358/475 |
| 2012/0013952 A1* | 1/2012 | Shimizu ............ | H04N 1/00002 358/448 |
| 2012/0206779 A1 | 8/2012 | Suto et al. | |
| 2012/0243058 A1 | 9/2012 | Iguchi | |
| 2013/0271975 A1 | 10/2013 | Cui et al. | |
| 2014/0139893 A1 | 5/2014 | Sugiyama et al. | |
| 2014/0355303 A1 | 12/2014 | Fujiuchi et al. | |
| 2014/0376068 A1 | 12/2014 | Imoto et al. | |
| 2015/0098744 A1 | 4/2015 | Nakanishi et al. | |
| 2015/0365556 A1 | 12/2015 | Imoto et al. | |
| 2016/0006897 A1 | 1/2016 | Suto et al. | |
| 2016/0306314 A1 | 10/2016 | Suto et al. | |
| 2016/0352954 A1 | 12/2016 | Yamada et al. | |

FOREIGN PATENT DOCUMENTS

| | | |
|---|---|---|
| JP | 6-62184 A | 3/1994 |
| JP | 2004-320538 A | 11/2004 |
| JP | 2005-102112 A | 4/2005 |
| JP | 2008-35036 A | 2/2008 |
| JP | 2008-35043 A | 2/2008 |
| JP | 2009-9144 A | 1/2009 |
| JP | 2009-31423 A | 2/2009 |

OTHER PUBLICATIONS

Notice of Allowance dated Mar. 30, 2015 for U.S. Appl. No. 14/292,502.
Office Action dated Dec. 12, 2014 for U.S. Appl. No. 14/292,502.
Office Action dated Oct. 10, 2013 for U.S. Appl. No. 13/502,678.
Notice of Allowance dated Jan. 10, 2017 in U.S. Appl. No. 15/174,385.
Office Action dated Aug. 10, 2016 in U.S. Appl. No. 15/174,385.

* cited by examiner

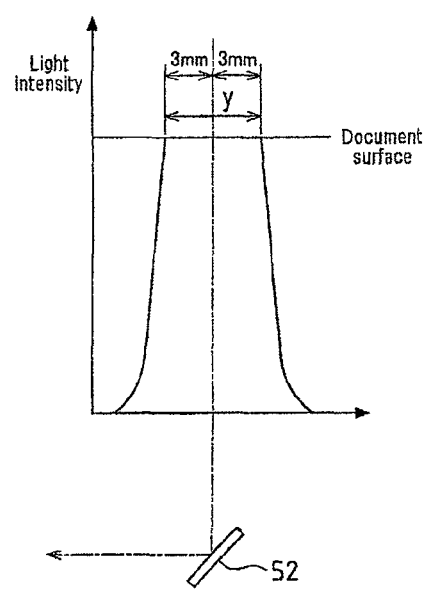
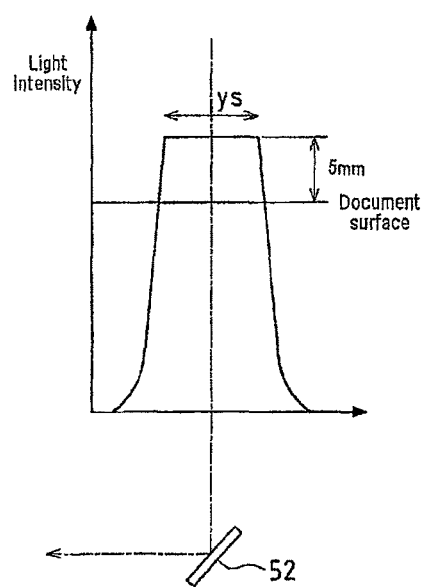
FIG.6 (a)
FIG. 6 (b)

ILLUMINATING DEVICE, IMAGE READING APPARATUS INCLUDING THE ILLUMINATING DEVICE, AND IMAGE FORMING APPARATUS INCLUDING THE IMAGE READING APPARATUS

This application is a continuation application of co-pending application Ser. No. 15/174,385 filed Jun. 6, 2016, which is a divisional of application Ser. No. 14/750,919 filed Jun. 25, 2015, now U.S. Pat. No. 9,383,500 issued Jul. 5, 2016, which is a divisional of application Ser. No. 14/292,502 on May 30, 2014, now U.S. Pat. No. 9,097,830 issued Aug. 4, 2015, which is a continuation of application Ser. No. 13/502,678 filed on Apr. 18, 2012, now U.S. Pat. No. 8,755,095 issued Jun. 17, 2014, and for which priority is claimed under 35 U.S.C. § 120, application Ser. No. 13/502,678 is the national phase of PCT International Application No. PCT/JP2010/068150 filed on Oct. 15, 2010 under 35 U.S.C. § 371, which claims the benefit of priority of JP2009-251251 filed Oct. 30, 2009. The entire contents of each of the above-identified applications are hereby incorporated by reference.

TECHNICAL FIELD

The present invention relates to an illuminating device that illuminates an irradiated object such as a document, an image reading apparatus including the illuminating device, and an image forming apparatus including the image reading apparatus.

BACKGROUND ART

Illuminating devices of this type are mounted on, for example, an image reading apparatus to be used, and each include a plurality of light-emitting elements (e.g., LEDs) that are arranged in a row and parallel to a main scanning direction for reading a document, and illuminate the document using these light-emitting elements. The image reading apparatus reads the entire document by repeatedly scanning the document being illuminated by the illuminating device along the main scanning direction, while scanning the document also in a sub-scanning direction. The image of the read document is output to a printer or the like to be recorded on a recording sheet.

In this illuminating device, although it is desirable to cause all the light emitted from the light-emitting elements to enter the reading range of the document, actually, it is not possible to cause all the light to enter the reading range of the document, causing light loss, and thus reducing the light loss is desired.

For this reason, in Patent Document 1, a condensing body is provided in the light emission direction of the light-emitting elements such that almost all the light from the light-emitting elements enters the incident-side lens of the condensing body to be emitted from the condensing body toward the reading range of the document, or a prism face is formed in a part of the condensing body or a reflective plate is provided separately from the condensing body such that light transmitted through the condensing body is reflected by the prism face or the reflective plate to be emitted toward the reading range of the document, thereby attempting to reduce the light loss.

Also, in Patent Documents 2 and 3, the light-emitting elements and a light-guiding body are mounted on a substrate, and the light-guiding body is positioned on the light emission side of the light-emitting elements such that light from the light-emitting elements is condensed with the light-guiding body to be emitted toward the reading range of the document, or such that light that has not passed through the light-guiding body is reflected by the reflective plate to be emitted toward the reading range of the document, thereby attempting to reduce the light loss.

PRIOR ART DOCUMENTS

Patent Documents

[Patent Document 1] JP 2005-102112A
[Patent Document 2] JP 2008-35036A
[Patent Document 3] JP 2008-35043A

SUMMARY OF INVENTION

Problems to be Solved by the Invention

However, Patent Document 1 discloses a configuration in which the incident-side lens of the condensing body is disposed near the light-emitting elements such that light transmitted through the condensing body is reflected by the prism face or the reflective plate to be emitted toward the document, and thus if the position of the incident-side lens of the condensing body is displaced even slightly with respect to the light-emitting elements, the path of the light passing through the condensing body greatly deviates, which greatly increases the light loss. However, Patent Document 1 does not clearly disclose a specific structure for supporting the condensing body and adjusting the position thereof, which indicates that realizing such a structure is difficult.

Also, although light that has not passed through the light-guiding body is reflected by the reflective plate to be emitted toward the document in Patent Documents 2 and 3, since the light that has not passed through the light-guiding body is dispersed light, it is impossible to cause all the light to enter the reflective plate, which results in insufficient reduction of the light loss.

In view of these problems of conventional techniques, it is an object of the present invention to provide an illuminating device capable of stably illuminating an irradiated object such as a document while suppressing light loss with a simple structure, an image reading apparatus including the illuminating device, and an image forming apparatus including the image reading apparatus.

Means for Solving the Problems

In order to solve the foregoing problems, an illuminating device of the present invention is an illuminating device including: a light-emitting element; a light-guiding member that guides light from the light-emitting element toward an irradiated object; and a reflective member that reflects the light from the light-emitting element, the illuminating device illuminating the irradiated object with light that has been transmitted through the light-guiding member and light that has been transmitted through the light-guiding member and reflected by the reflective member, wherein the light-emitting element and the reflective member are disposed to sandwich a path through which light reflected by the irradiated object passes, and the light-guiding member is disposed on a side of the light-emitting element, the light-guiding member includes a direct emission unit that is disposed between the irradiated object and the light-emitting element, and through which light emitting from the light-emitting element to the irradiated object is transmitted, and an indirect emission unit that is disposed between the reflective member and the light-emitting element, and through which light emitting from the light-emitting element to the irradiated object via the reflective member is transmitted, and a light incidence face of the direct emission unit and a light incidence face of the indirect emission unit are disposed at mutually different positions around the light-emitting element, and the light-emitting element is disposed on a side of an interior angle formed by the light incidence faces.

With the illuminating device of the present invention, light emitted from the light-emitting element passes through one of a direct path extending from the direct emission unit to the irradiated object or an indirect path extending from the indirect emission unit to the irradiated object via the reflective member, thereby illuminating the irradiated object. Since one of the paths, namely, the direct path, is short, light incident on the irradiated object is scarcely dispersed, and thus it is possible to clearly illuminate the irradiated object with incident light reaching through the direct path, but the irradiated object is readily unevenly illuminated. Also, since the other path, namely, indirect path, is long, light incident on the irradiated object is dispersed such that the level of illumination of the irradiated object with the light reaching through the indirect path is low. However, uneven illumination of the irradiated object rarely occurs. By combining illumination through the direct path with that through the indirect path, it is possible to stably illuminate the irradiated object while suppressing the light loss.

Also, with the illuminating device of the present invention, an area of the light incidence face of the direct emission unit differs from an area of the light incidence face of the indirect emission unit, or the area of the light incidence face of the direct emission unit is larger than the area of the light incidence face of the indirect emission unit.

By setting the area of the direct emission unit and the area of the indirect emission unit as described above, it is possible to appropriately set the ratio between the illumination level of the irradiated object through the direct emission unit and the illumination level of the irradiated object through the indirect emission unit, that is, light distribution between the direct path and the indirect path. Also, since the direct path and the indirect path have mutually different orientations relative to the reading range of the irradiated object, even if a shadow of an end portion of the irradiated object is generated due to the light emitting along one of the paths illuminating the end portion of the irradiated object, that shadow of the end portion of the irradiated object is illuminated by the light emitting along the other path, and thus it is possible to vanish the shadow of the end portion of the irradiated object.

Also, with the illuminating device of the present invention, a light emission face of the light-emitting element faces a side of the indirect emission unit.

Also by setting the orientation of the light emission face of the light-emitting element as described above, it is possible to appropriately set the ratio between the illumination level of the irradiated object through the direct emission unit and the illumination level of the irradiated object through the indirect emission unit.

Further, with the illuminating device of the present invention, each of the light incidence face of the direct emission unit and the light incidence face of the indirect emission unit is a flat surface.

In this case, even if the light-guiding member is displaced, a situation will hardly occur in which the amount of incident light from the light-emitting element on the direct emission unit and the amount of incident light from the light-emitting element on the indirect emission unit greatly drop at the same time, which suppresses the light loss.

Also, with the illuminating device of the present invention, each of the light emission face of the direct emission unit and the light emission face of the indirect emission unit has a convex shape and a condensing property.

With this configuration, it is possible to appropriately specify the illumination range of the irradiated object.

Further, with the illuminating device of the present invention, a substrate on which the light-emitting element is mounted is provided, and the direct emission unit and the indirect emission unit cover a surface of the substrate on which the light-emitting element is mounted, or a substrate on which the light-emitting element is mounted is provided, and at least one of the direct emission unit and the indirect emission unit is directly fixed to the substrate.

With this configuration, it is possible to easily position the direct emission unit and the indirect emission unit with respect to the light-emitting element, and thus the irradiated object can be stably illuminated.

Further, with the illuminating device of the present invention, a direction of light reflected by the reflective member is oriented to a position that is beyond a reading reference position of the irradiated object.

In this case, even in a state in which the irradiated object comes off the reading reference position, it is possible to fully illuminate the portion of the irradiated object that comes off the reading reference position.

For example, the direction of reflected light is set with a part of a reflection surface of the reflective member.

In this case, it is possible, with the light reflected by the reflective member, not only to illuminate a position beyond the reading reference position of the irradiated object, but also to illuminate other position, which can expand the range that can be illuminated by the light reflected by the reflective member.

An image reading apparatus of the present invention includes the illuminating device of the present invention.

Also, an image forming apparatus of the present invention includes the image reading apparatus of the present invention.

Also with the image reading apparatus and the image forming apparatus, the same effects as those of the above-described illuminating device of the present invention can be achieved.

Effects of the Invention

According to the present invention, light-emitting elements and a reflective member are disposed such that the passing path of light reflected by an irradiated object runs therebetween, and a light-guiding member is provided on the light-emitting element side. The light-guiding member includes a direct emission unit that is disposed between the irradiated object and the light-emitting elements, and that transmits light from the light-emitting elements toward the irradiated object, and an indirect emission unit that is disposed between the reflective member and the light-emitting elements, and that transmits light from the light-emitting elements toward the irradiated object via the reflective member. A light incidence face of the direct emission unit and a light incidence face of the indirect emission unit are disposed at mutually different positions around the light-emitting elements, and the light-emitting elements are disposed on the side of an interior angle formed by the light incidence faces. Accordingly, light emitted from the light-emitting elements emits along either a direct path extending from the direct emission unit to the irradiated object, or an indirect path extending from the indirect emission unit to the irradiated object via the reflective member, thereby illuminating the irradiated object. Although since one of the paths, namely, the direct path, is short, light incident on the irradiated object is scarcely dispersed such that it is possible to illuminate the irradiated object clearly with the incident light reaching through the direct path, the irradiated object is readily illuminated unevenly. Also, although since the other path, namely, the indirect path, is long, light incident on the irradiated object is dispersed such that the level of illumination by the light reaching through the indirect path of the irradiated object is low, uneven illumination of the irradiated object rarely occurs. By combining illumination through the direct path with that through the indirect path, it is possible to stably illuminate the irradiated object while suppressing light loss.

BRIEF DESCRIPTION OF DRAWINGS

FIG. 6A is a graph showing the light intensity for a first indirect path, and FIG. 6B is a graph showing the light intensity for a second indirect path.

MODES FOR CARRYING OUT THE INVENTION

Embodiments of the present invention will be described below in detail with reference to the attached drawings.

Figure 1:
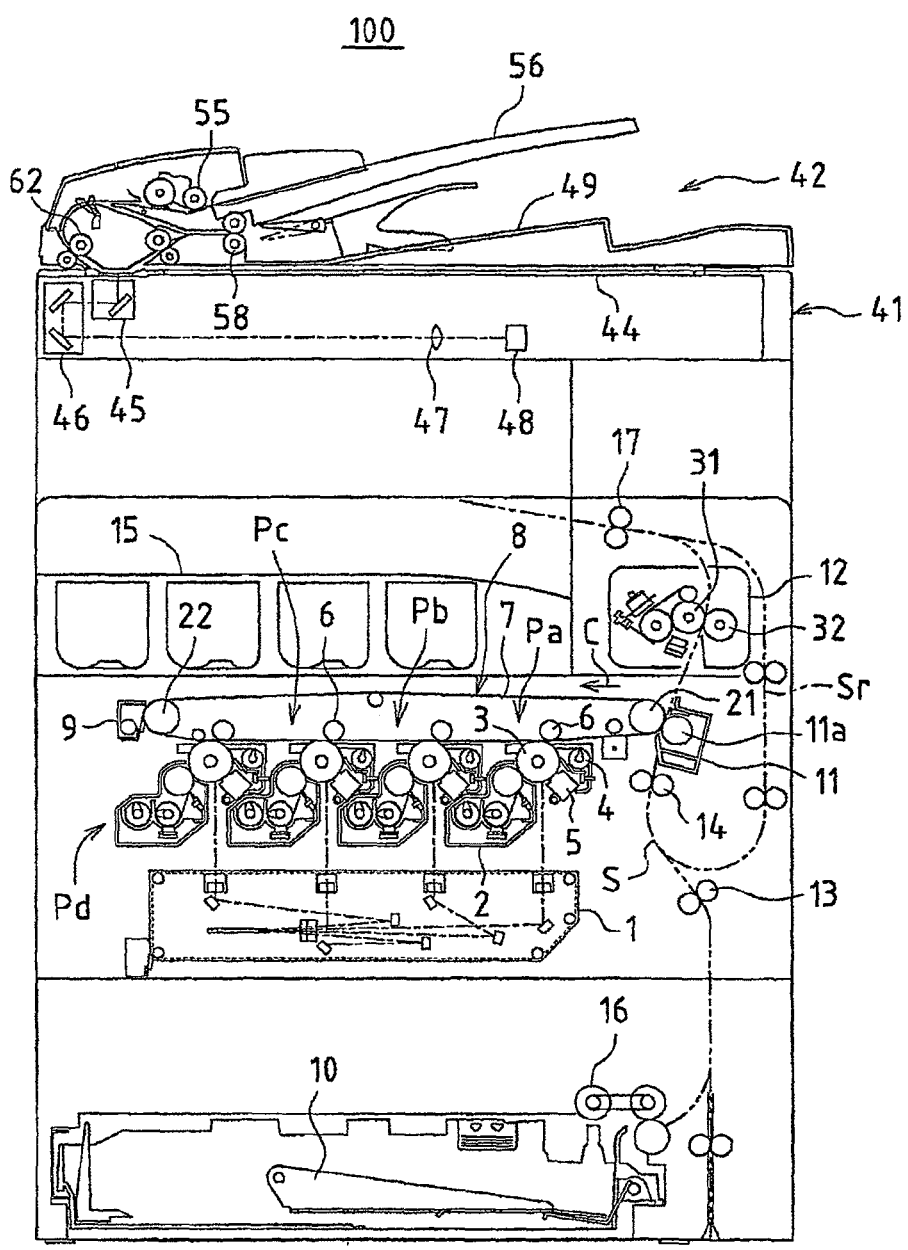
FIG. 1 is a cross-sectional view showing an image forming apparatus including an image reading apparatus to which an illuminating device according to an embodiment of the present invention is applied.

FIG. 1 is a cross-sectional view showing an image forming apparatus provided with an image reading apparatus to which an illuminating device according to an embodiment of the present invention is applied. The image forming apparatus 100 is a so-called multifunction peripheral having a scanner function, a copy function, a printer function, a facsimile function, and the like. The image forming apparatus 100 transmits an image of a document read by an image reading apparatus 41 to the outside (this function corresponds to a scanner function), and forms and records on a recording sheet, in color or monochrome, an image of the read document or an image received from the outside (this function corresponds to a copy function, a printer function, and a facsimile function).

The image forming apparatus 100 includes a laser exposure apparatus 1, development apparatuses 2, photosensitive drums 3, charging units 5, cleaner apparatuses 4, an intermediate transfer belt apparatus 8, a fixing apparatus 12, a paper transport path S, a paper feed tray 10, a paper discharge tray 15, and the like, in order to print an image on a recording sheet.

Image data processed in the image forming apparatus 100 corresponds to a color image using colors consisting of black (K), cyan (C), magenta (M), and yellow (Y), or corresponds to a monochrome image using a monochrome color (e.g., black). Accordingly, four each of the development apparatuses 2, the photosensitive drums 3, the charging units 5, and the cleaner apparatuses 4 are provided so as to form four types of toner images corresponding to the respective colors, and respectively associated with black, cyan, magenta, and yellow to constitute four image stations Pa, Pb, Pc, and Pd are formed.

The photosensitive drums 3 each have a photosensitive layer on their surfaces. The charging units 5 are charging means for uniformly charging the surfaces of the photosensitive drums 3 to a predetermined potential. As the charging units 5, a contact-type charging unit using a roller or brush, or a charger-type charging unit is used.

The laser exposure apparatus 1 is a laser scanning unit (LSU) provided with laser diodes and reflecting mirrors, and causes the charged surfaces of the photosensitive drums 3 to be exposed to light according to image data to form electrostatic latent images corresponding to the image data on the surfaces.

The development apparatuses 2 develop the electrostatic latent images formed on the surfaces of the respective photosensitive drums 3 using toners of the respective colors, and form toner images on the surfaces of the photosensitive drums 3. The cleaner apparatuses 4 remove and collect toners remaining on the surfaces of the respective photosensitive drums 3 after development and image transfer.

The intermediate transfer belt apparatus 8 is disposed above the photosensitive drums 3, and provided with an intermediate transfer belt 7, an intermediate transfer belt-driving roller 21, an idler roller 22, four intermediate transfer rollers 6, and an intermediate transfer belt-cleaning apparatus 9.

The intermediate transfer belt 7 is obtained by forming a film having a thickness of approximately 100 μm to 150 μm into an endless belt. The intermediate transfer belt-driving roller 21, the intermediate transfer rollers 6, the idler roller 22, and the like support the intermediate transfer belt 7 in a stretched and tensioned manner, and rotate the intermediate transfer belt 7 around in the direction of arrow C.

The intermediate transfer rollers 6 are supported in a rotatable manner near the intermediate transfer belt 7, and pressed via the intermediate transfer belt 7 against the respective photosensitive drums 3.

The toner images on the surfaces of the photosensitive drums 3 are sequentially transferred and superimposed on the intermediate transfer belt 7, and a color toner image (a toner image containing the above-described colors) is formed on the intermediate transfer belt 7. The toner images are transferred from the photosensitive drums 3 to the intermediate transfer belt 7, using the intermediate transfer rollers 6 pressed against the back face of the intermediate transfer belt 7. The intermediate transfer rollers 6 are rollers each including a base that is made of a metal (e.g., stainless steel) shaft having a diameter of 8 to 10 mm, with the surface of the shaft being covered by an electrically conductive elastic material (e.g., ethylene-propylene-diene rubber (EPDM), polyurethane foam, etc.). In order to transfer the toner images, a high-voltage transfer bias (a high voltage of the opposite polarity (+) to the charge polarity (−) of the toner) is applied to the intermediate transfer rollers 6, and the electrically conductive elastic material enables a high voltage to be uniformly applied to a recording sheet.

In this manner, the toner images on the surfaces of the photosensitive drums 3 are superimposed on the intermediate transfer belt 7, and form a color toner image represented by the image data. This color toner image is transported together with the intermediate transfer belt 7, and transferred to a recording sheet at a nip region between the intermediate transfer belt 7 and a transfer roller 11*a* of a secondary transfer apparatus 11.

A voltage (a high voltage of the opposite polarity (+) to the charge polarity (−) of the toner) for transferring the toner image containing the above-described colors on the intermediate transfer belt 7 to the recording sheet is applied to the transfer roller 11*a* of the secondary transfer apparatus 11. Furthermore, in order to constantly maintain the nip region between the intermediate transfer belt 7 and the transfer roller 11*a* of the secondary transfer apparatus 11, one of the transfer roller 11*a* of the secondary transfer apparatus 11 and the intermediate transfer belt-driving roller 21 is made of a hard material (metal, etc.), and the other is made of a soft material such as an elastic roller (elastic rubber roller, foamable resin roller, etc.).

The toner image on the intermediate transfer belt 7 may not be completely transferred by the secondary transfer apparatus 11 to the recording sheet, and toner may remain on the intermediate transfer belt 7. This residual toner causes toner color mixing in a subsequent step. Accordingly, residual toner is removed and collected by the intermediate transfer belt-cleaning apparatus 9. The intermediate transfer belt-cleaning apparatus 9 includes, for example, a cleaning blade that is in contact with the intermediate transfer belt 7 and removes the residual toner as a cleaning member. The idler roller 22 supports the intermediate transfer belt 7 from the back face at a point where the cleaning blade is in contact with the intermediate transfer belt 7.

After the color toner image is transferred at the nip region between the intermediate transfer belt 7 and the transfer roller 11*a* of the secondary transfer apparatus 11, the recording sheet is transported to the fixing apparatus 12. The fixing apparatus 12 is provided with a heat roller 31, a pressure roller 32, and the like, and the recording sheet is sandwiched between the heat roller 31 and the pressure roller 32 and transported.

The heat roller 31 is controlled so as to be at a predetermined fixing temperature based on detection output of a temperature detector (not shown), and performs thermal pressing on the recording sheet with the pressure roller 32 to melt, mix, and press the color toner image transferred to the recording sheet, thereby thermally fixing the color toner image to the recording sheet.

Meanwhile, the paper feed tray 10 is a tray in which recording sheets are stored. The paper feed tray 10 is disposed in the lower portion in the image forming apparatus 100, and supplies the recording sheets in the paper feed tray 10.

The image forming apparatus 100 includes an S-shaped paper transport path S for transporting the recording sheet supplied from the paper feed tray 10 via the secondary transfer apparatus 11 and the fixing apparatus 12 onto the paper discharge tray 15. Along the paper transport path S, a paper pickup roller 16, paper registration rollers 14, the fixing apparatus 12, transport rollers 13, paper discharge rollers 17, and the like are arranged.

The paper pickup roller 16 is a draw-in roller that is disposed in an end portion of the paper feed tray 10 and that feeds recording sheets sheet by sheet from the paper feed tray 10 into the paper transport path S. The transport rollers 13 are a plurality of pairs of small rollers for promoting and assisting transportation of a recording sheet.

The paper registration rollers 14 temporarily stop a recording sheet that has been transported, align the leading edge of the recording sheet, and transport the recording sheet with good timing matched with the rotation of the photosensitive drums 3 and the intermediate transfer belt 7 such that the color toner image on the intermediate transfer belt 7 is transferred to the recording sheet at the nip region between the intermediate transfer belt 7 and the transfer roller 11*a* of the secondary transfer apparatus 11.

For example, based on detection output of a pre-registration detection switch (not shown), the paper registration rollers 14 transport the recording sheet such that the leading edge of the color toner image on the intermediate transfer belt 7 matches the leading edge of the image formation region of the recording sheet in the nip region between the intermediate transfer belt 7 and the transfer roller 11*a* of the secondary transfer apparatus 11.

Furthermore, after the color toner image is fixed at the fixing apparatus 12, the recording sheet passes through the fixing apparatus 12, and is discharged facedown by the paper discharge rollers 17 onto the paper discharge tray 15.

Furthermore, when performing printing not only on the front face of the recording sheet but also on the back face, the paper discharge rollers 17 on the paper transport path S are stopped and then rotated in reverse during transportation of the recording sheet by the paper discharge rollers 17, the recording sheet is passed through a reversing path Sr where the front and the back of the recording sheet are reversed, and then the recording sheet is guided to the paper registration rollers 14. Subsequently, as in the case of the front face of the recording sheet, an image is recorded and fixed to the back face of the recording sheet, and the recording sheet is discharged onto the paper discharge tray 15.

Figure 2:
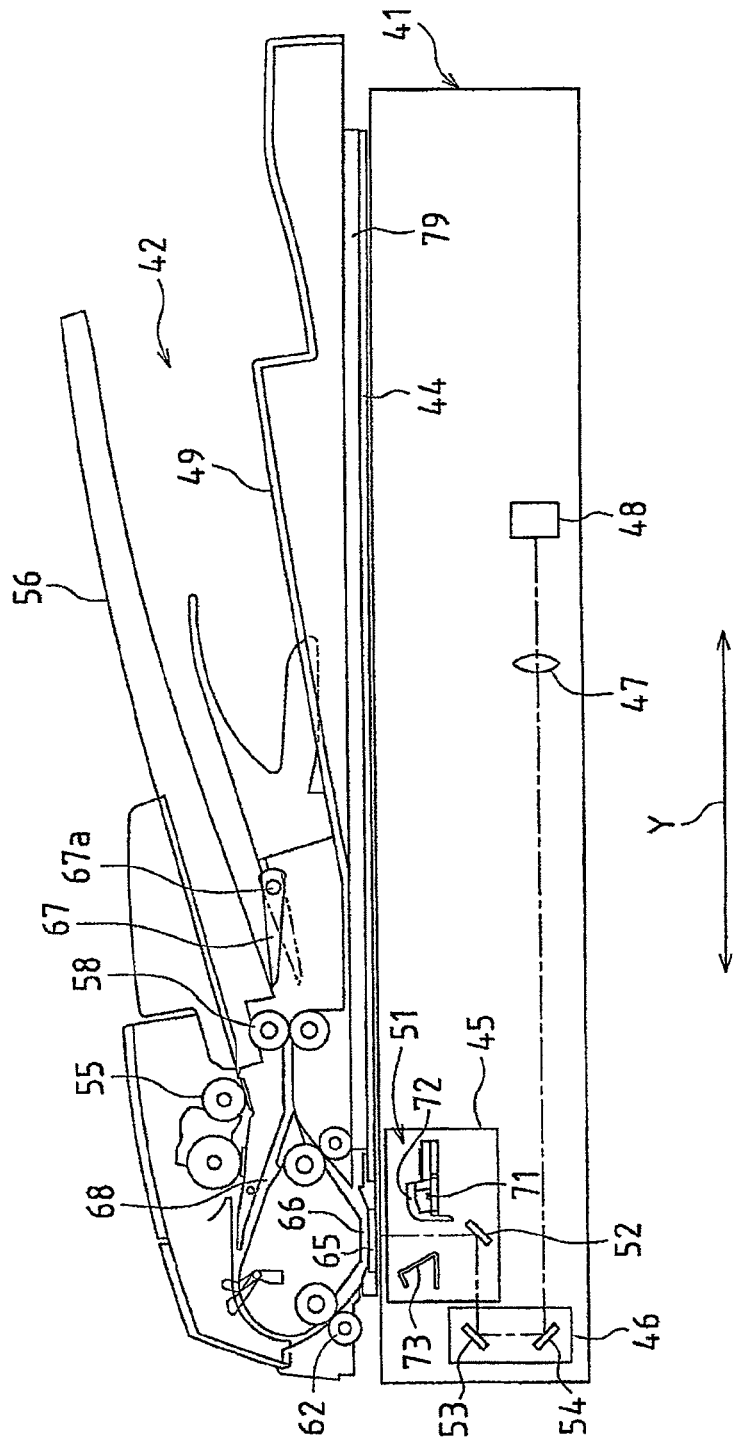
FIG. 2 is an enlarged cross-sectional view of the image reading apparatus and a document transport apparatus in FIG. 1.

Next, the image reading apparatus 41 and a document-transporting apparatus 42 will be described in detail. FIG. 2 is an enlarged cross-sectional view showing the image reading apparatus 41 and the document-transporting apparatus 42.

An inner side of the document-transporting apparatus 42 is axially supported by a hinge (not shown) on an inner side of the image reading apparatus 41, and the document-transporting apparatus 42 is opened or closed by lifting or lowering an outer side portion thereof. When the document-transporting apparatus 42 is opened, a platen glass 44 of the image reading apparatus 41 is exposed, and a document is placed on the platen glass 44.

The image reading apparatus 41 is provided with the platen glass 44, a first scanning unit 45, a second scanning unit 46, an imaging lens 47, a charge coupled device (CCD) 48, and the like. The first scanning unit 45 is provided with an illuminating device 51 and a first reflecting mirror 52. While the first scanning unit 45 is moving at a constant speed V by a distance according to the document size in a sub-scanning direction Y, the document on the platen glass 44 is exposed by the illuminating device 51 and the reflected light is reflected by the first reflecting mirror 52 and guided to the second scanning unit 46, and, thus, the image on the document surface is scanned in the sub-scanning direction Y. The second scanning unit 46 is provided with a second reflecting mirror 53 and a third reflecting mirror 54. While the second scanning unit 46 is moving following the first scanning unit 45 at a speed V/2, the reflected light from the document is reflected by the second reflecting mirror 53 and the third reflecting mirror 54 and guided to the imaging lens 47. The imaging lens 47 condenses the reflected light from the document onto the CCD 48, and forms the image on the document surface on the CCD 48. The CCD 48 repeatedly scans the image on the document in the main-scanning direction, and outputs analog image signals for one main scanning line at each instance of scanning.

The first scanning unit 45 and the second scanning unit 46 respectively include pulleys (not shown). A wire (not shown) is wound onto these pulleys, the wire is driven by a stepping motor, and, thus, the first scanning unit 45 and the second scanning unit 46 are moved in synchronization.

Furthermore, the image reading apparatus 41 can read not only a still document but also an image on the surface of a document that is being transported by the document-transporting apparatus 42. In this case, as shown in FIG. 2, the first scanning unit 45 is moved to a reading range below a document-reading glass 65, and the second scanning unit 46 is positioned according to the position of the first scanning unit 45. Then, in this state, the document-transporting apparatus 42 starts transportation of the document.

In the document-transporting apparatus 42, a pickup roller 55 is pressed against a document on a document tray 56 and rotated, the document is drawn in and transported, the leading edge of the document is abutted against registration rollers 62 for alignment, and, then, the document is passed through between the document-reading glass 65 and a reading guide plate 66 and discharged from paper discharge rollers 58 onto a paper discharge tray 49.

While the document is being transported, the illuminating device 51 of the first scanning unit 45 illuminates the document surface via the document-reading glass 65, the reflected light from the document surface is guided by the reflecting mirrors of the first scanning unit 45 and the second scanning unit 46 to the imaging lens 47, and condensed by the imaging lens 47 onto the CCD 48, the image on the document surface is formed on the CCD 48, and, thus, the image on the document surface is read.

Furthermore, when reading the back face of the document, an intermediate tray 67 has been rotated about a shaft 67a as indicated by the dotted line, and the paper discharge rollers 58 are stopped during discharge of the document from the paper discharge rollers 58 onto the paper discharge tray 49 such that the document is received by the intermediate tray 67. Then, the paper discharge rollers 58 are rotated in reverse, and the document is guided via a reverse transport path 68 to the registration rollers 62, thereby reversing the front and the back of the document. Then, as in the case of the image on the front face of the document, the image on the back face of the document is read, the intermediate tray 67 is returned to its original position indicated by the solid line, and the document is discharged from the paper discharge rollers 58 onto the paper discharge tray 49.

In this manner, the image on the document surface thus read by the CCD 48 is output from the CCD 48 as analog image signals, and these analog image signals are A/D converted into digital image signals. These digital image signals are subjected to various types of image processing and then transmitted to the laser exposure apparatus 1 of the image forming apparatus 100, the image is recorded on a recording sheet in the image forming apparatus 100, and this recording sheet is output as a photocopied document.

The document on the platen glass 44 or the document-reading glass 65 is illuminated by the illuminating device 51 of the first scanning unit 45. Here, it is desirable to reduce the light loss by causing almost all the light emitted from an LED array 71 of the illuminating device 51 to enter the document.

Thus, the illuminating device 51 of this embodiment includes a light-guiding member 72 that directly guides the light emitted from the LED array 71 toward the document and guides the light toward a reflective plate 73, and the reflective plate 73 that reflects the light guided thereto by the light-guiding member 72 toward the document. Accordingly, almost all the light emitted from the LED array 71 is caused to enter the document, thereby reducing the light loss.

Figure 3:
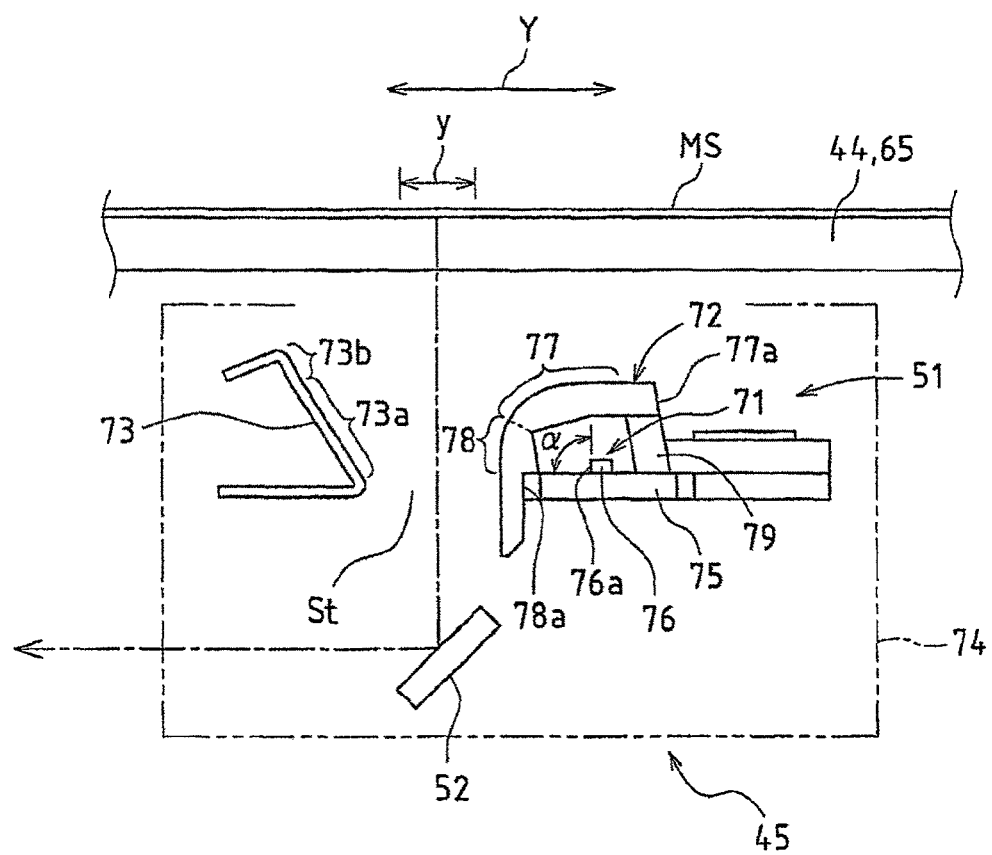
FIG. 3 is a cross-sectional view schematically showing a first scanning unit of the image reading apparatus.
Figure 4:
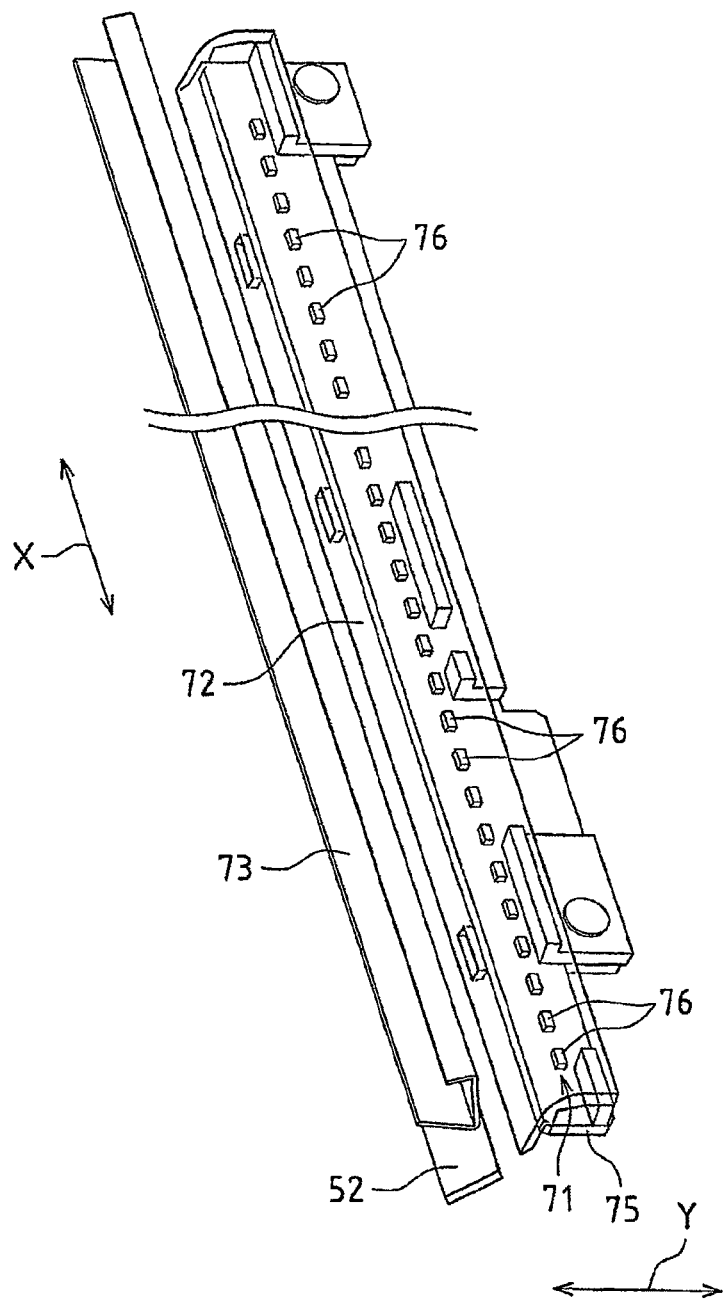
FIG. 4 is a perspective view schematically showing the first scanning unit in FIG. 3.

Next, the configuration of the illuminating device 51 of this embodiment will be described in detail. FIG. 3 is a cross-sectional view schematically showing the first scanning unit 45. FIG. 4 is a perspective view schematically showing the first scanning unit 45.

As clearly seen in FIGS. 3 and 4, the first scanning unit 45 is provided with the illuminating device 51, the first reflecting mirror 52, and a moving frame 74. The illuminating device 51 and the first reflecting mirror 52 are mounted on the moving frame 74, both ends of the moving frame 74 are slidably supported, and the moving frame 74 is moved in the sub-scanning direction Y by the pulley, the wire, and the stepping motor.

The illuminating device 51 includes a substrate 75, the LED array 71 mounted on the substrate 75, the light-guiding member 72 fixedly supported by the substrate 75, and the reflective plate 73. Each of these substrate 75, LED array 71, light-guiding member 72 and reflective plate 73 is disposed such that the longitudinal direction thereof is in a main scanning direction X for reading a document MS, and has substantially the same length as the reading range in the main scanning direction X.

The LED array 71 is made up of a plurality of LEDs 76 arranged in a row in the main scanning direction X on the substrate 75. Each LED 76 is connected to the wiring pattern of the substrate 75, and the wiring pattern of the substrate 75 is connected to a driver circuit (not shown) mounted on the moving frame 74 through a harness (not shown). The driver circuit supplies power to the LEDs 76 through the harness and the wiring pattern of the substrate 75, thereby lighting on and off the LEDs 76.

The light-guiding member 72 is made of glass or synthetic resin having translucency, and includes a direct emission unit 77 disposed between an illumination range y centered on the document reading position in the sub-scanning direction Y and the LED array 71, and an indirect emission unit 78 disposed between the reflective plate 73 and the LED array 71. The direct emission unit 77 and the indirect emission unit 78 are connected to each other so as to form a single unit, and the surface side of the substrate 75 is covered by these emission units 77 and 78. The direct emission unit 77 covers a portion obliquely above the substrate 75, that is, a portion on the side of the illumination range y in the sub-scanning direction Y, and the indirect emission unit 78 covers a portion on the left of the substrate 75, that is, a portion on the side of the reflective plate 73.

The indirect emission unit 78 includes a step unit 78a on its inner side, and the step unit 78a is fitted to an end of the substrate 75 such that the indirect emission unit 78 is fixedly supported by the substrate 75. Also, the left end side of the direct emission unit 77 is connected to the indirect emission unit 78, a right end 77a of the direct emission unit 77 is disposed on a projection 79 on the substrate 75 and fixed, and the direct emission unit 77 is thereby fixedly supported by the substrate 75.

The$innev surfaces of the direct emisrion unit 77 and 'the indirect emssion unit 78 (light incidence faces facing the LED array 71) ape flat surfaces. The light incidence faces of the direct emicsion uniô 77 and the indirect emission unit 78 are disposed at mutually different positions around the LED Array 71, and the LED array 71 is disposed on the side of an interior angle formed by these light incidence faces. Here, the interior angle for}ed by the light incidence faces is an angle smaller than 0180 degrees.

In addition, the outer surfaces of the direât emission unit 77 and the indirect emission unit 78 (light emission faces facing the illumination range y in the sub-scanning direction Y and the reflective plate 73) are conveh. The outer convex surfaces of the emission units 77 and w8 are for-ed to condense light that has been transmitted through the emission unit 77 and Light that has been transmitted through the emission unit 78 and reflected by the reflective plate 73 onto the illumination range y in the sub-scanning direction Y.

Also, the space between the LED array 71 and the reflective plate 73 is formed as a slit St that extends in the main scanning direction X, and the illumination range y in the sub-scanning direction Y is provided directly above the slit St, and the first reflecting mirror 52 is positioned directly below the slit St. The light-guiding member 72 is disposed on the LED array 71 side with respect to the slit St.

Light emission faces 76a of the LEDs 76 of the LED array 71 face the reflective plate 73 side, and the optical axes of the LEDs 76 are oriented leftward. The emission range of the light from each LED 76 is a range that is centered on the optical axis of the LED 76 and covers, in any direction, up to approximately 90 degrees from the optical axis. Also, the color of the surface of the substrate 75 is white, and light emitted from the LEDs 76 is reflected by the surface of the substrate 75. Therefore, almost all the light from the LEDs 76 is emitted to a 90-degree range α, which is a range between the surface of the substrate 75 and an orthogonal plane that is orthogonal to the surface of the substrate 75 and passes through the LEDs 76.

In addition, the reflective plate 73 includes a first reflective face 73a and a second reflective face 73b. The first and second reflective faces 73a and 73b are disposed tilted upward so as to be capable of reflecting light emitted from the LED array 71 toward the illumination range y in the sub-scanning direction Y. Also, the second reflective face 73b is slightly bent with respect to the first reflective face 73a to change the orientation of the second reflective face 73b.

Furthermore, the first reflecting mirror 52 is disposed parallel to the main scanning direction and also tilted by 45 degrees with respect to the scanning face (the surface of the platen glass 44 and the document reading glass 65).

Figure 5:
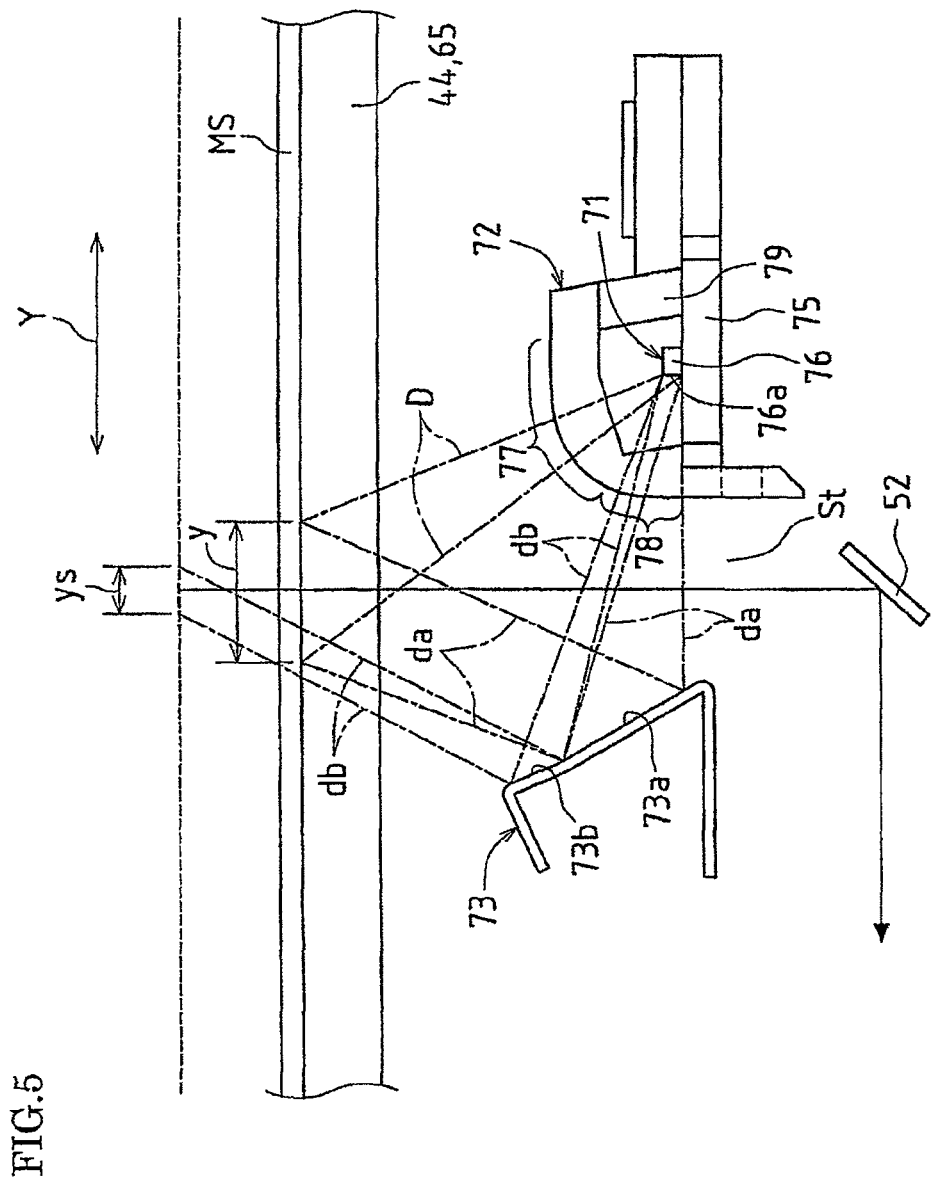
FIG. 5 is a cross-sectional view showing a state of illumination by an illuminating device of the first scanning unit in FIG. 3.

In the illuminating device 51 configured as described above, as shown in FIG. 5, when the LED array 71 on the substrate 75 emits light, the light emitted from the LED array 71 enters the light incidence face of the direct emission unit 77 of the light-guiding member 72, is transmitted through the direct emission unit 77, is condensed by the outer convex surface of the direct emission unit 77, and enters the illumination range y in the sub-scanning direction Y on the surface of the platen glass 44 and the document reading glass 65 (document reading reference position).

When a light path from the LED array 71 to the illumination range y in the sub-scanning direction Y via the direct emission unit 77 is a direct path D, the direct path D represents shortest linear paths from the LED array 71 to within the illumination range y, and the illumination range y in the sub-scanning direction Y is illuminated by the light reaching through the direct path D.

Also, light emitted from the LED array 71 enters the light incidence face of the indirect emission unit 78 of the light-guiding member 72, is transmitted through the indirect emission unit 78, is condensed by the outer convex surface of the indirect emission unit 78, enters the first reflective face 73a of the reflective plate 73 to be reflected by the first reflective face 73a, and enters the illumination range y in the sub-scanning direction Y When a light path from the LED array 71 to the illumination range y in the sub-scanning direction Y via the indirect emission unit 78 and the first reflective face 73a is a first indirect path da, the first indirect path da represents paths that are longer than the direct path D as a result of being bent at the first reflective face 73a. The illumination range y in the sub-scanning direction Y is illuminated also by the light reaching through the first indirect path da.

Furthermore, light emitted from the LED array 71 is transmitted through the indirect emission unit 78 of the light-guiding member 72, is condensed by the outer convex surface of the indirect emission unit 78, enters the second reflective face 73b of the reflective plate 73 to be reflected by the second reflective face 73b, and enters an illumination range ys in the sub-scanning direction Y, the illumination range ys being 5 mm above the surface of the platen glass 44 and the document reading glass 65 (document reading reference position).

When the light path from the LED array 71 to the illumination range ys in the sub-scanning direction Y via the indirect emission unit 78 and the second reflective face 73b is a second indirect path db, the second indirect path db also represents paths that are longer than the direct path D as a result of being bent at the second reflective face 73b. The light reaching through the second indirect path db illuminates the illumination range ys in the sub-scanning direction Y, which is 5 mm above the document reading reference position. The illumination range ys at the position 5 mm above the document reading reference position is set by slightly bending the second reflective face 73b with respect to the first reflective face 73a, as described above.

FIG. 6A is a graph showing the light intensity for the first indirect path da, and FIG. 6B is a graph showing the light intensity for the second indirect path db.

Light emitting along the first indirect path da is condensed by the convex surface of the indirect emission unit 78. Therefore, the light intensity is high at the position corresponding to the surface of the document MS (document reading reference position), as shown in FIG. 6A, and is kept at a substantially constant level within the illumination range y in the sub-scanning direction Y at this surface position. The illumination range y has a width of 3 mm extending from the center of the range y (reading position) both forward and backward in the sub-scanning direction Y, totally, a width of 6 mm.

Light emitting along the second indirect path db is condensed by the convex surface of the indirect emission unit 78. Therefore, the light intensity is high at the position 5 mm above the surface of the document MS as shown in FIG. 6B, and is kept at a substantially constant level within the illumination range ys in the sub-scanning direction Y at the position 5 mm above the surface of the document MS. The illumination range ys is narrower than the illumination range y.

Accordingly, the illumination range y in the sub-scanning direction Y at the same level as the surface of the document MS is illuminated by light emitting along linear direct paths D, which are formed by the light being transmitted through the direct emission unit 77, and also by light emitting along first indirect paths da, which are formed by the light being transmitted through the indirect emission unit 78 and reflected by the first reflective face 73a of the reflective plate 73. As a result, the surface of the document MS is evenly illuminated with strong light.

Figure 7:
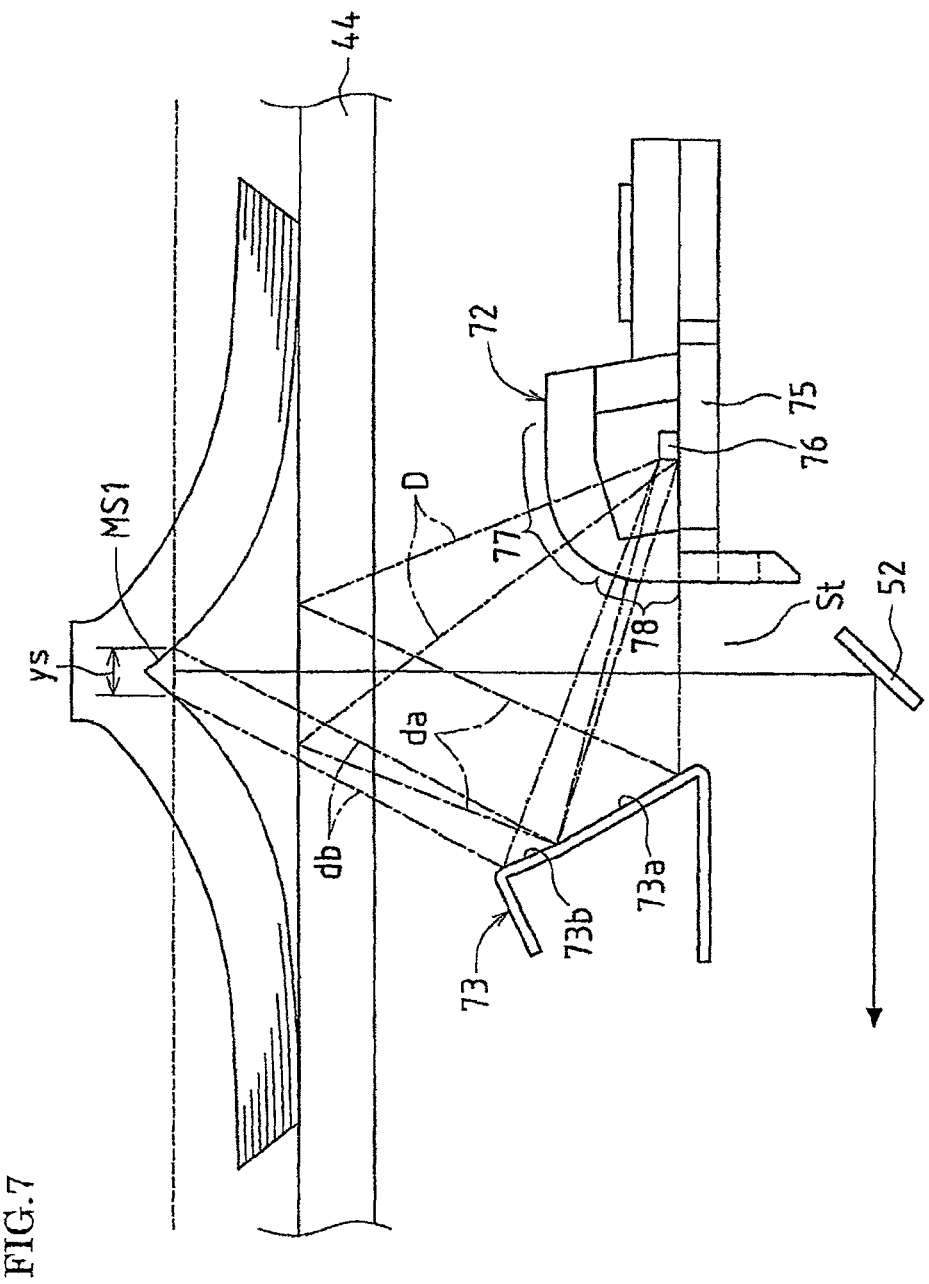
FIG. 7 shows an illumination state of a book.

Also, the illumination range ys in the sub-scanning direction Y at the position 5 mm above the surface of the document MS is illuminated with light emitting along the second indirect paths db, which are formed by the light being transmitted through the indirect emission unit 78 and reflected by the second reflective face 73b of the reflective plate 73. Therefore, even if the surface of the document MS comes off the platen glass 44 or the document reading glass 65, the surface is illuminated. For example, in the state where a book is opened and placed on the platen glass 44 as shown in FIG. 7, although the pages come off the surface in a portion MS1 where the book is bound, the light emitting along the second indirect paths db reaches and illuminates the portion of the pages coming off the surface as well.

Light emitted from the LED array 71 in this manner irradiates the document MS on the platen glass 44 or the document reading glass 65 via the light-guiding member 72 or the reflective plate 73. Light reflected by the document MS passes through the slit St (passing path of light), is reflected by the first reflecting mirror 52 such that the reflected light is emitted toward the second reflecting mirror 53 of the second scanning unit 46 through an opening in a side wall of the moving frame 74.

Incidentally, since the direct emission unit 77 condenses the light incident on the inner flat surface of the direct emission unit 77 to cause the light to enter the illumination range y in the sub-scanning direction Y, the larger the area of the inner flat surface of the direct emission unit 77, the larger the amount of light that enters the illumination range y in the sub-scanning direction Y from the direct emission unit 77.

Similarly, since the indirect emission unit 78 condenses the light incident on the inner flat surface of the indirect emission unit 78 to cause the light to enter the illumination range y in the sub-scanning direction Y, the larger the area of the inner flat surface of the indirect emission unit 78, the larger the amount of light that enters the illumination range y in the sub-scanning direction Y from the indirect emission unit 78.

Accordingly, by appropriately setting the areas of the inner flat surfaces of the direct emission unit 77 and the indirect emission unit 78, it is possible to adjust a proportion between the amount of light that has been transmitted through the direct emission unit 77 and enters the illumination range y in the sub-scanning direction Y and the amount of light that has been transmitted through the indirect emission unit 78, reflected by the first reflective face 73a of the reflective plate 73, and enters the illumination range y in the sub-scanning direction Y.

Specifically, since a light emission face 76a of the LED array 71 faces the reflective plate 73 side, the amount of light emitted from the LED array 71 is large in the direction of the reflective plate 73. However, by setting the area of the indirect emission unit 78 interposed between the LED array 71 and the reflective plate 73 to be smaller than the area of the direct emission unit 77, it is possible to set the ratio between the amount of light that enters the illumination range y via the indirect emission unit 78 and the first reflective face 73a of the reflective plate 73 and the amount of light that enters the illumination range y via the direct emission unit 77 to, for example, 4:6 to 5:5.

Also, since light that has been transmitted through the direct emission unit 77 and enters the illumination range y is condensed by the direct emission unit 77 and also emits along a substantially linear and short direct path D, the level of illumination by the light is high. However, uneven illumination readily occurs due to the LEDs 76 of the LED array 71 disposed separate from each other.

In contrast, although light that has been transmitted through the indirect emission unit 78, reflected by the first reflective face 73a of the reflective plate 73, and enters the illumination range y is condensed by the indirect emission unit 78, since the light emits along a long and bent first indirect path da, it results in relatively dispersed light compared with the light transmitted through the direct emission unit 77, and thus the light causes little uneven illumination in spite of its low illumination level.

Therefore, it is possible to adjust the illumination level and uneven illumination by appropriately setting the areas of the direct emission unit 77 and the indirect emission unit 78 so as to adjust the ratio between the amount of light that has been transmitted through the direct emission unit 77 and enters the illumination range y and the amount of light that has been transmitted through the indirect emission unit 78, reflected by the first reflective face 73a of the reflective plate 73, and enters the illumination range y.

Figure 8:
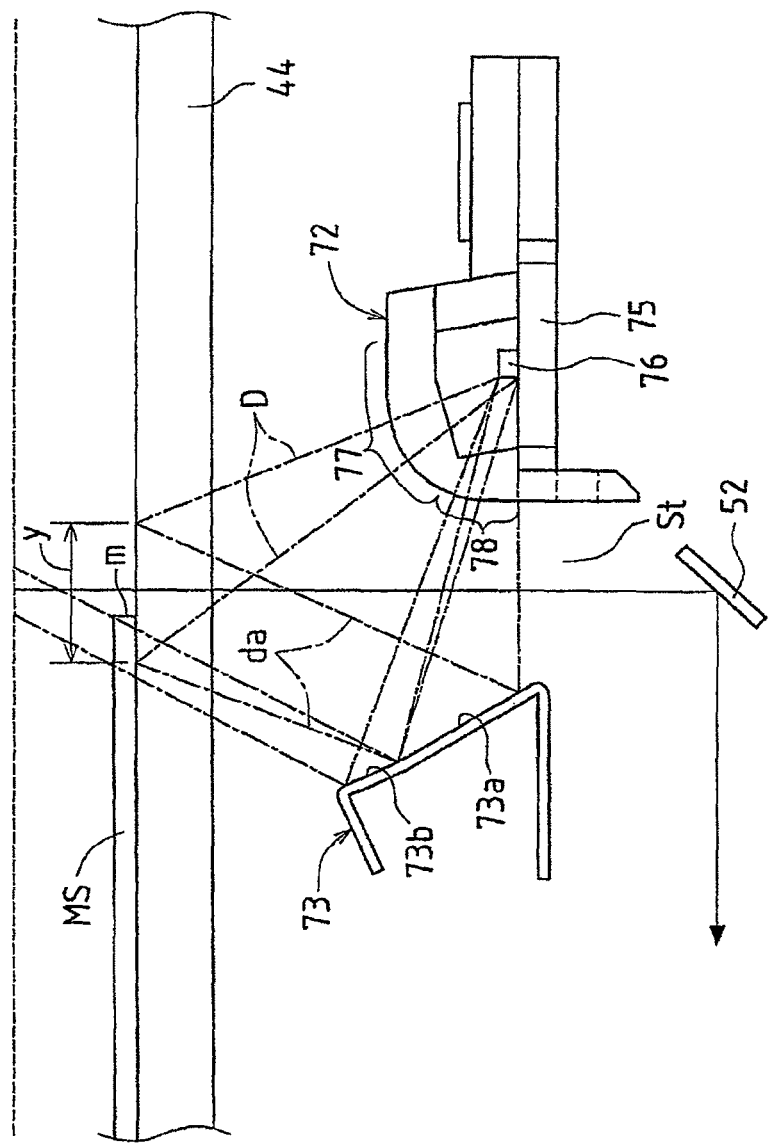
FIG. 8 shows an illumination state of a rear end portion of a document.

Also, the incident direction of light that has been transmitted through the direct emission unit 77 and enters the illumination range y differs from that of light that has been reflected by the reflective plate 73 and enters the illumination range y. For this reason, even in the state where, as shown in FIG. 8 for example, a rear end portion m of the document MS is within the illumination range y, and light reflected by the first reflective face 73a of the reflective plate 73 enters the rear end portion m of the document MS to generate a shadow of the rear end portion m, that shadow disappears due to entering of light that has been transmitted through the direct emission unit 77. That is, since the rear end portion m of the document MS is irradiated with light reaching from its front and back, the shadow of the rear end portion m of the document MS does not appear, and thus no shadow appears in the document image read by the CCD 48. In order to achieve this, it is preferable to set the ratio between the amount of light emitted to the illumination range y via the indirect emission unit 78 and the first reflective face 73a of the reflective plate 73 and the amount of light emitted to the illumination range y via the direct emission unit 77 to approximately 4:6.

Furthermore, the inner flat surface of the direct emission unit 77 and the inner flat surface of the indirect emission unit 78 face the LEDs 76 of the LED array 71 in mutually different directions. Therefore, even if the light-guiding member 72 is displaced, a situation will hardly occur in which the amount of incident light from the LED array 71 to the direct emission unit 77 and the amount of incident light from the LED array 71 to the indirect emission unit 78 greatly drop at the same time, which suppresses the light loss. In contrast, in Patent Document 1, since it has a configuration in which the incident-side lens of the condensing body is disposed near the light-emitting elements, and light that has been transmitted through the condensing body is reflected by the prism face or the reflective plate to be emitted toward the document, if the incident-side lens of the condensing body is displaced, even slightly, with respect to the light-emitting elements, the path of light passing through the condensing body greatly deviates, which greatly increases the light loss.

Also, as shown in FIGS. 3 and 4, since the direct emission unit 77 covers a portion obliquely above the LED array 71, and the indirect emission unit 78 covers a portion on the left of the LED array 71, almost all the light emitted from the LED array 71 within the 90-degree range a is transmitted through the direct emission unit 77 or the indirect emission unit 78 to enter the illumination range y, which suppresses the light loss.

Also, since the color of the surface of the substrate 75 is white, light reflected by the surface of the substrate 75 is also transmitted through the direct emission unit 77 or the indirect emission unit 78 to enter the illumination range y, which suppresses the light loss.

Furthermore, since both the direct emission unit 77 and the indirect emission unit 78 are securely supported by the substrate 75 on which the LED array 71 is mounted, the direct emission unit 77 and the indirect emission unit 78 can be positioned with respect to the LED array 71 with high accuracy, and also positional displacement thereof hardly occurs, which can prevent the light loss due to the positional displacement.

Above, a preferred embodiment of the present invention was described with reference to the attached drawings, but of course the invention is not limited to that embodiment. It will be clear to those skilled in the art that within the category described in the claims, various modified or revised examples can be arrived at, and it is understood that such changes or modifications also obviously fall within the technical scope of the present invention. For example, the direct emission unit 77 and the indirect emission unit 78 of the light-guiding member 72 may be formed as separate units.

DESCRIPTION OF REFERENCE NUMERALS

1 Laser exposure apparatus
2 Development apparatuses
3 Photosensitive drums
4 Cleaner apparatuses
5 Charging units
8 Intermediate transfer belt apparatus
10 Paper feed tray
11 Secondary transfer apparatus
12 Fixing apparatus
41 Image reading apparatus
42 Document transport apparatus
44 Platen glass
45 First scanning unit
46 Second scanning unit
47 Imaging lens
48 CCD (Charge Coupled Device)
51 Illuminating device
52 First reflecting mirror
53 Second reflecting mirror
54 Third reflecting mirror
65 Document reading glass
71 LED array
72 Light-guiding member
73 Reflective plate
74 Moving frame
75 Substrate
76 LEDs
77 Direct emission unit
78 Indirect emission unit
100 Image forming apparatus

The invention claimed is:

1. An illuminating device comprising:
a light-emitting element mounted on a substrate; and
a light-guiding member that guides light from the light-emitting element toward an irradiated object,
wherein the light-guiding member is disposed on a surface side of the substrate on which the light-emitting element is mounted, and comprises an extending portion that extends outward from an end portion of the substrate.

2. The illuminating device according to claim 1, further comprising:
a white portion on a surface of the substrate,
wherein the white portion is provided at least between the light-guiding member and the light-guiding member.

3. The illuminating device according to claim 1, wherein a light emission face of the light-guiding member has a convex shape and a condensing property.

4. The illuminating device according to claim 1, wherein the light-guiding member comprises a first light emission face and a second light emission face.

5. The illuminating device according to claim 4, wherein an area of the first light emission face is larger than an area of the second light emission face.

6. The illuminating device according to claim 1, wherein the light-guiding member comprises a first light emission face and a second light emission face, and each of the first light emission face and the second light emission face has a convex shape and a condensing property.

7. The illuminating device according to claim 6, wherein an area of the first light emission face is larger than an area of the second light emission face.

8. The illuminating device according to claim 1, wherein a light incidence face of the light-guiding member that the light from the light-emitting element enters is a flat surface.

9. An image reading apparatus comprising the illuminating device according to claim 1.

* * * * *